(12) United States Patent
Boehm et al.

(10) Patent No.: US 12,001,707 B2
(45) Date of Patent: Jun. 4, 2024

(54) HOST VERIFICATION FOR A MEMORY DEVICE

(71) Applicant: Micron Technology, Inc., Boise, ID (US)

(72) Inventors: Aaron P. Boehm, Boise, ID (US); Steffen Buch, Munich (DE); Lance W. Dover, Fair Oaks, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/396,529

(22) Filed: Aug. 6, 2021

(65) Prior Publication Data

US 2022/0057960 A1 Feb. 24, 2022

Related U.S. Application Data

(60) Provisional application No. 63/068,044, filed on Aug. 20, 2020.

(51) Int. Cl.
*G06F 3/06* (2006.01)

(52) U.S. Cl.
CPC .......... *G06F 3/0655* (2013.01); *G06F 3/0623* (2013.01); *G06F 3/0679* (2013.01)

(58) Field of Classification Search
CPC .... G06F 3/0622; G06F 3/0623; G06F 3/0632; G06F 3/0634; G06F 3/0637; G06F 3/0655; G06F 3/0659; G06F 3/0679; G06F 3/0688
USPC ....... 711/152, 154, 163, 164; 726/17, 29, 30
See application file for complete search history.

(56) References Cited

U.S. PATENT DOCUMENTS

| | | | |
|---|---|---|---|
| 8,555,083 B1* | 10/2013 | Nanda | G06F 21/6209 380/278 |
| 10,242,175 B2 | 3/2019 | Teegavarapu et al. | |
| 2004/0230784 A1* | 11/2004 | Cohen | G06F 9/44521 713/1 |
| 2007/0283114 A1* | 12/2007 | Lawrence | G06F 11/1456 711/163 |
| 2008/0154839 A1* | 6/2008 | Araki | G06F 3/0632 |
| 2011/0314304 A1* | 12/2011 | Braams | G06F 21/78 713/193 |
| 2014/0032910 A1 | 1/2014 | Nagai et al. | |
| 2015/0178224 A1 | 6/2015 | Seo et al. | |

(Continued)

OTHER PUBLICATIONS

ISA/KR, International Search Report and Written Opinion of the International Searching Authority, Int'l Appl. No. PCT/US2021/045517, dated Nov. 29, 2021, Korean Intellectual Property Office, Seo-gu, Daejeon, Republic of Korea, 10pgs.

*Primary Examiner* — Michael Krofcheck
(74) *Attorney, Agent, or Firm* — Holland & Hart LLP

(57) ABSTRACT

Methods, systems, and devices for host verification for a memory device are described. A memory device may receive a first value from a host device that is associated with an identification of the host device after an event. The memory device may transmit a second value to the host device that is based on the first value and comprises a random set of bits. The memory device may receive from the host device data or a command that comprises an encrypted third value that is based at least in part on the second value and a secret shared between the host device and the memory device. The memory device may also enable a functionality of the memory device based on the encrypted third value.

28 Claims, 10 Drawing Sheets

(56) References Cited

U.S. PATENT DOCUMENTS

| | | |
|---|---|---|
| 2015/0242657 A1 | 8/2015 | Kim |
| 2017/0262626 A1* | 9/2017 | Teegavarapu ............ G06F 21/44 |
| 2019/0173875 A1* | 6/2019 | Nagai .................... G06F 3/0679 |
| 2020/0244458 A1 | 7/2020 | Kanbe |
| 2022/0050926 A1* | 2/2022 | Golov ................... G06F 3/0679 |

\* cited by examiner

HOST VERIFICATION FOR A MEMORY DEVICE

CROSS REFERENCE

The present Application for Patent claims the benefit of U.S. Provisional Patent Application Ser. No. 63/068,044 by BOEHM et al., entitled "HOST VERIFICATION FOR A MEMORY DEVICE," filed Aug. 20, 2020, assigned to the assignee hereof, and expressly incorporated by reference herein.

BACKGROUND

The following relates generally to one or more systems for memory and more specifically to host verification for a memory device.

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

Figure 1:
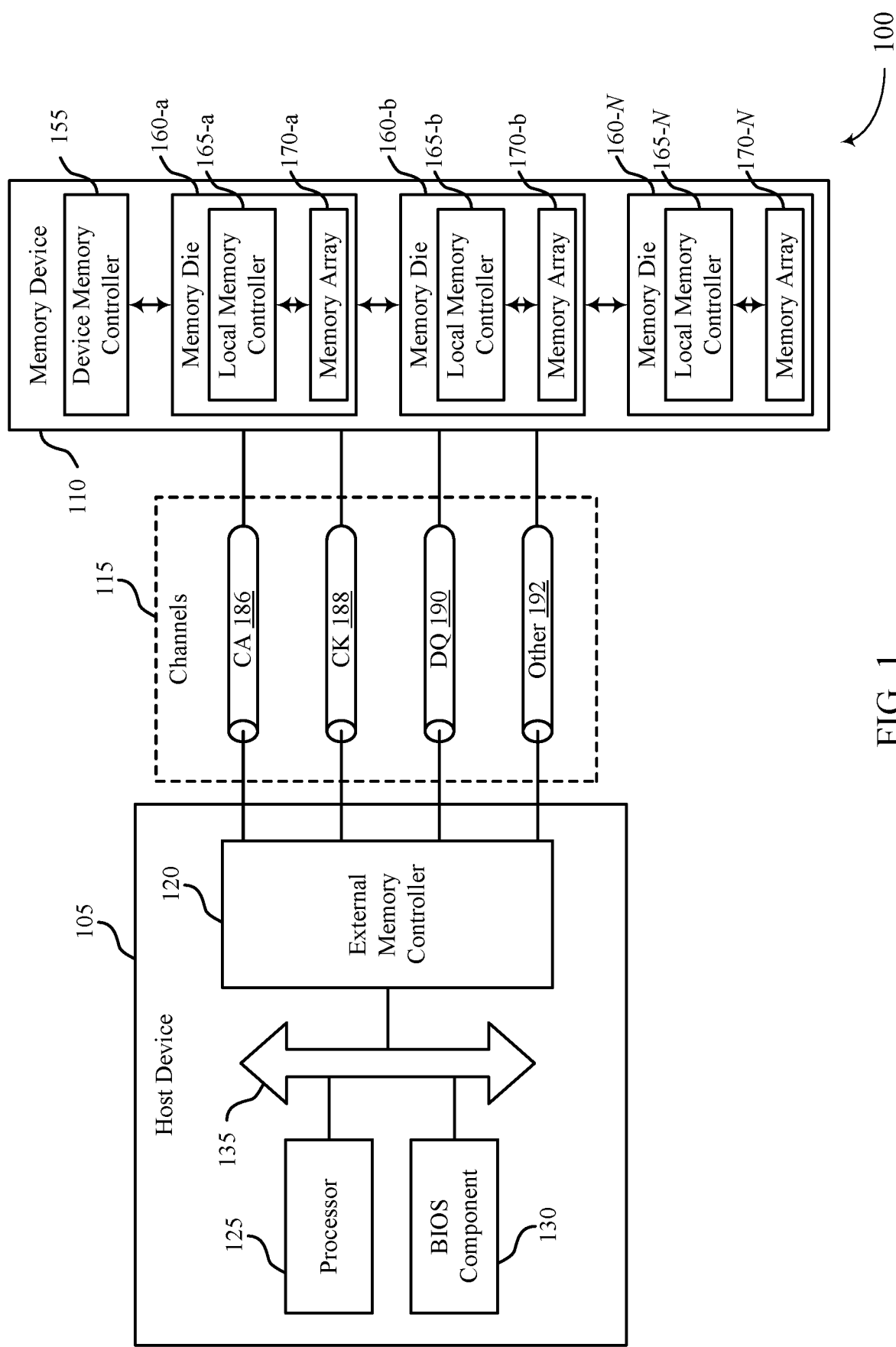
FIG. 1 illustrates an example of a system that supports host verification for a memory device in accordance with examples as disclosed herein.

A system may include a memory device and a host device coupled with the memory device. In some examples, the memory device may implement a low power mode to conserve power while still maintaining the data written to the memory device. For example, some applications, such as vehicle safety systems, autonomous vehicle systems, or other safety systems, may employ a suspend to RAM mode (e.g., the low power mode) during certain periods. In such examples, the memory device may enter a low power state when a vehicle system associated with the memory system is turned off. Additionally, the memory system may be configured to exit the low power mode quickly to increase the efficiency and the overall performance of the memory device. For example, the memory device may exit the low power mode quickly to experience improved start-up times for components of the vehicle safety systems, autonomous vehicle systems, or other safety systems (e.g., a back-up camera). In some cases, the system may have an increased likelihood of being attacked or exploited while utilizing the low power mode. For example, an unauthorized party may attempt to gain access of the memory device by exploiting the operations or functionality of the device, modify data on the memory device, attempt a denial of service attack that causes excessive wear out, current draw, and physical damage to the memory device, or utilize a cold boot attack—e.g., cool the memory device down to preserve data and then physically remove the memory device from the memory system to obtain the data. Additionally, the unauthorized party may attempt to gain access to data written to the memory device by inspecting a bus coupling the host device and the memory device and utilizing a replay attack—e.g., implement commands identical to those observed to gain access to the memory device. Such examples may pose a threat to the security and safety of the memory device.

Systems, devices, and techniques are described for improving security in memory systems by utilizing an access control technique (e.g., a validation technique) each time the memory device exits the low power mode to validate that the host is an authorized user of the memory device. For example, the memory device may support a limited functionality (e.g., read-only access) before the host device is verified. In some examples, when the memory device exits the low power mode, the host device and memory device may share a secret key to enable the host device to generate an encrypted value. The host device may then send the encrypted value to the memory device for verification. If the memory device verifies the encrypted value, the memory device may enable the full functionality (e.g., read and write access). If the memory device fails to validate the encrypted value, the memory device may remain in the limited functionality, lock out to further access, or set an alert to prevent the unauthorized host device from gaining access to the data written to the memory device or causing additional wear out damage.

Additionally or alternatively, the memory system may also implement an anti-replay technique for each access command communicated between the host device and memory device to prevent an unauthorized user from utilizing replay attacks. For example, after the host device is validated, the host device may utilize the secret key shared between the memory system and the host device as a seed for a randomization process to generate a first value (e.g., one or more bits of data) associated with an identification of an access command (e.g., a read, write, or refresh command) to be sent to the memory device. In some examples, the memory device may utilize a randomization process that is synchronized with the host device. For example, the memory device may also use the secret key as a seed for the randomization process that occurs at the memory device to generate a second value associated with the identification of the access command. Thus, the memory device may compare the second value generated with the first value received from the host device to validate the command as being from an authorized user before executing the access command. If the memory device fails to validate the first value, the memory device may refrain from executing the access command, lock out to further access, or set an alert to prevent the unauthorized host device from gaining access to the data written to the memory device or causing additional wear out damage.

Features of the disclosure are initially described in the context of systems and dies as described with reference to FIG. 1. Features of the disclosure are described in the context flow diagrams as described with reference to FIGS. 2-4. These and other features of the disclosure are further illustrated by and described with reference to apparatus diagrams and flowcharts that relate to host verification for a memory device as described with reference to FIGS. 5-10.

FIG. 1 illustrates an example of a system 100 that supports host verification for a memory device in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system operable to store data for one or more other components of the system 100.

At least portions of the system 100 may be examples of the host device 105. The host device 105 may be an example of a processor or other circuitry within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host or a host device 105.

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other factors.

The memory device 110 may be operable to store data for the components of the host device 105. In some examples, the memory device 110 may act as a slave-type device to the host device 105 (e.g., responding to and executing commands provided by the host device 105 through the external memory controller 120). Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of host device 105 may be coupled with one another using a bus 135.

The processor 125 may be operable to provide control or other functionality for at least portions of the system 100 or at least portions of the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include a program or software stored in one or more of read-only memory (ROM), flash memory, or other non-volatile memory.

The memory device 110 may include a device memory controller 155 and one or more memory dies 160 (e.g., memory chips) to support a desired capacity or a specified capacity for data storage. Each memory die 160 may include a local memory controller 165 (e.g., local memory controller 165-*a*, local memory controller 165-*b*, local memory controller 165-N) and a memory array 170 (e.g., memory array 170-*a*, memory array 170-*b*, memory array 170-N). A memory array 170 may be a collection (e.g., one or more grids, one or more banks, one or more tiles, one or more sections) of memory cells, with each memory cell being operable to store at least one bit of data. A memory device 110 including two or more memory dies may be referred to as a multi-die memory or a multi-die package or a multi-chip memory or a multi-chip package.

The device memory controller 155 may include circuits, logic, or components operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may receive data or commands or both from the host device 105. For example, the memory device 110 may receive a write command indicating that the memory device 110 is to store data for the host device 105 or a read command indicating that the memory device 110 is to provide data stored in a memory die 160 to the host device 105.

A local memory controller 165 (e.g., local to a memory die 160) may include circuits, logic, or components operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165, or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other circuits or controllers operable for supporting described operations of the device memory controller 155 or local memory controller 165 or both.

The external memory controller 120 may be operable to enable communication of one or more of information, data, or commands between components of the system 100 or the host device 105 (e.g., the processor 125) and the memory device 110. The external memory controller 120 may convert or translate communications exchanged between the components of the host device 105 and the memory device 110. In some examples, the external memory controller 120 or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be examples of transmission mediums that carry information between the host device 105 and the memory device. Each channel 115 may include one or more signal paths or transmission mediums (e.g., conductors) between terminals associated with the components of system 100. A signal path may be an example of a conductive path operable to carry a signal. For example, a channel 115 may include a first terminal including one or more pins or pads at the host device 105 and one or more pins or pads at the memory device 110. A pin may be an example of a conductive input or output point of a device of the system 100, and a pin may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, the memory device 110 may implement a low power mode to conserve power while maintaining the data written to the memory device 110. The memory device 110 may be susceptible to attacks while exiting the low power mode. For example, an authorized party may attempt to gain data written to the memory device 110 via cold boot attacks, replay attacks, and/or other invasive measures. Such examples may pose a threat to the security and safety of the memory device 110.

The techniques described herein may improve security in the memory device 110 by utilizing an access control technique to validate the host device 105 to mitigate the risk of an unauthorized user modifying or stealing data written to the memory device 110. In some examples, the memory device 110 may support limited functionality (e.g., read-only access) until the host device 105 is validated by sharing a secret key between the host device 105 and the memory device 110. Additionally, the memory device 110 may implement anti-replay techniques that assign a unique value (e.g., a tag) to each access command received from the host device 105. The memory device 110 may validate the unique value by implementing a randomization process that is synchronized with the host device 105. If the validation techniques of either the access control or anti-replay fail, the memory device 110 may implement countermeasures to mitigate the risk of an unauthorized user modifying or stealing data written to the memory device 110. In some examples, these techniques may be implemented in vehicle safety systems or autonomous vehicle systems as such systems may utilize the low power mode frequently and may be suspectable to attack. In other examples, these techniques may be implemented in a computer, a laptop computer, a tablet computer, a smartphone, a cellular phone, a wearable device, an internet-connected device, other safety systems, or other devices that utilize the low power state to mitigate the risk of an unauthorized user modifying or stealing data from these systems.

Figure 2:
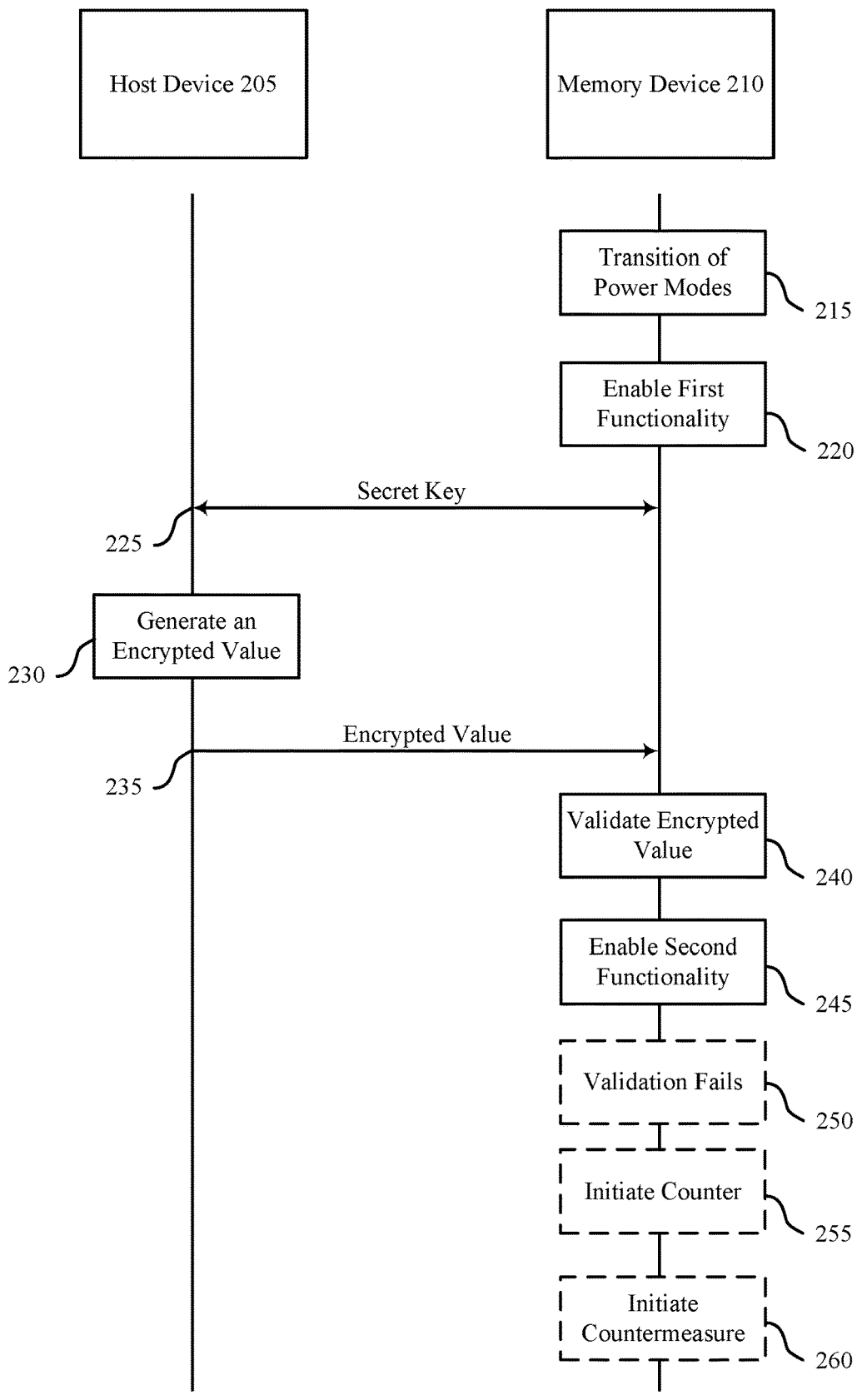
FIG. 2 illustrates an example of a flow diagram that supports host verification for a memory device in accordance with examples as disclosed herein.

FIG. 2 illustrates an example of a flow diagram 200 that supports host verification for a memory device in accordance with examples as disclosed herein. Flow diagram 200 may include host device 205 and memory device 210, which may be respective examples of a host device 105 and a memory device 110 as described with reference to FIG. 1. Although shown in a particular sequence or order, unless otherwise specified, the order of the processes may be modified. Thus, the illustrated examples are used as examples, and the illustrated processes may be performed in a different order, and some processes may be performed in parallel. Additionally, one or more processes may be omitted in various examples. Thus, not all processes are used in every example. Other process flows are possible. The flow diagram 200 illustrates examples for access control techniques for a memory device.

At 215, the memory device 210 may transition from a first power mode to a second power mode. For example, the memory device 210 may transition from a power down mode to a power on mode. In other examples, the memory device 210 may exit a low power mode such as a self-refresh mode. In some cases, the memory device 210 may transition from a first power mode to a second power mode during a hard or soft reset of the memory device 210. In other cases, the memory device 210 may transition from a first power mode to a second power mode as a countermeasure to certain events—e.g., an ECC (error correction code) error—occurring at the memory device as described with reference to 260 below. The memory device 210 may have an increased likelihood of being attacked or exploited when transitioning from the first power mode to the second power mode.

At 220, the memory device 210 may enable a first functionality based on transitioning from the first power mode to the second power mode. The memory device 210 may support a limited subset of functionality while in the first functionality mode. For example, the memory device 210 may support read-only operations that allow the host device 205 to read information from the memory device 210 but refrain from allowing the host device 205 to write data to or modify data at the memory device 210. In other examples, the memory device 210 may refrain from allowing the host device 205 to perform any type of access while in the first functionality.

At 225, the host device 205 and the memory device 210 may share a secret key between each other. For example, the host device 205 may generate a first value and transmit the first value to the memory device 210. In some examples, generating the first value may include the host device 205 generating a nonce value—e.g., an arbitrary quantity or value that may be used once in communications with the memory device—and transmitting the nonce value to the memory device 210. The memory device 210 may then generate a second value including a random set of bits by implementing a randomization process on the first value. For example, the memory device 210 may seed the randomization process with the first value to generate the second value. The memory device 210 may then transmit the second value to the host device 205.

At 230, the host device 205 may generate an encrypted value (e.g., a digital signature) based on receiving the second value from the memory device 210 and a secret associated with the host device and/or associated with both the host device 205 and the memory device 210. In some examples, the host device 205 may generate the encrypted value by implementing a randomization process. For example, the host device 205 may implement a cryptographic hash function or an algorithm on the second value. That is, the encrypted value may be a specific type of message authentication code (e.g., a hash-based message authentication code (HMAC)) or a cipher-based message authentication code (e.g., a cipher-based message authentication code (CMAC)) that the host device 205 generates based on receiving the second value. Alternatively, the host device 205 may generate a rolling cleartext password to be validated by the memory device 210. That is, the host device 205 may generate a password according to the randomization process that shifts each time the memory device 210 transitions from the first power mode to the second power mode.

At 235, the host device 205 may transmit to the memory device 210 the encrypted value based on the host device 205 generating the encrypted value. For example, the host device may communicate the HMAC or CMAC generated to the memory device 210.

At 240, the memory device 210 may validate the encrypted value received from the host device 205 to validate the host device 205 as an authorized user of the memory device 210. In some examples, the memory device 210 may validate the encrypted value by comparing the encrypted value with a stored value generated using a randomization process—e.g., a cryptographic hash function or an algorithm. That is, the memory device 210 may recreate the encrypted value by utilizing the randomization process on the secret key utilizing an algorithm. For example, the memory device 210 may combine an output of a pseudo-random number generator (PRNG) with the secret key stored at the memory device 210 utilizing the HMAC or CMAC algorithm to generate the stored value. Because the secret key of the memory device 210 and the host device 205 may be the same when the host device 205 is an authorized user, the output of the randomization process at the memory device 210 may match the output of the randomization process at the host device 205. The memory device 210 may validate the host device 205 if the stored value matches the encrypted value received. Alternatively, the memory device 210 may validate the host device 205 by generating a rolling cleartext password utilizing the randomization process and comparing the generated cleartext password at the memory device 210 with the clear text password received from the host device 205.

At 245, the memory device 210 may enable a second functionality of the memory device 210 based on validating the encrypted value with the stored value. The memory device 210 may enable some or all types of accesses (e.g., a read, write, or refresh access) while in the second functionality. In some examples, the second functionality may be associated with enabling a logical functionality of the memory device 210. By enabling the second functionality after the host device 205 is validated, the memory device 210 may decrease the likelihood of an unauthorized user modifying or otherwise writing data to the memory device 210.

At 250, the memory device 210 may refrain from validating the host device 205 based on the encrypted value received from the host device 205 being different than the stored value. That is, if the memory device 210 determines the encrypted value is different than the stored value, the memory device 210 may refrain from validating the host device 205 as an authorized user. In such examples, the memory device 210 may refrain from enabling the second functionality of the memory device 210 to avoid the data written to the memory device 210 from being modified.

At 255, the memory device 210 may initiate a counter and increment the counter to a first count value (e.g., one (1)) based on the encrypted value being different than the stored value. That is, the memory device 210 may record the quantity of times an unauthorized access takes place. In some examples, the memory device 210 may increment the count value of the counter by a quantity (e.g., one (1)) each time the memory device 210 determines an encrypted value received from the host device 205 is different than the stored value. For example, if the memory device 210 receives a second encrypted value that is different than the stored value, the memory device 210 may refrain from enabling the second functionality and increment the count value to two (2).

At 260, the memory device 210 may initiate a countermeasure based on the count value of the counter satisfying a predetermined threshold quantity. In some examples, the memory device 210 may program the predetermined threshold quantity to indicate the quantity of invalid attempts to validate the host device (e.g., the encrypted value received being different than the stored value) that are acceptable. In some examples, the predetermined threshold quantity may be dynamic—e.g., the predetermined threshold quantity may adjust based on certain events occurring at the memory device 210. The memory device 210 may lock out the host device 205 from further access based on initiating the countermeasure e.g., the memory device 310 may transition from the second functionality to the first functionality. In other examples, the memory device 210 may set or transmit an alert indicating that the predetermined threshold quantity was satisfied. By initiating the countermeasure, the memory device 210 may prevent an authorized user from modifying or stealing data written to the memory device 210.

Figure 3:
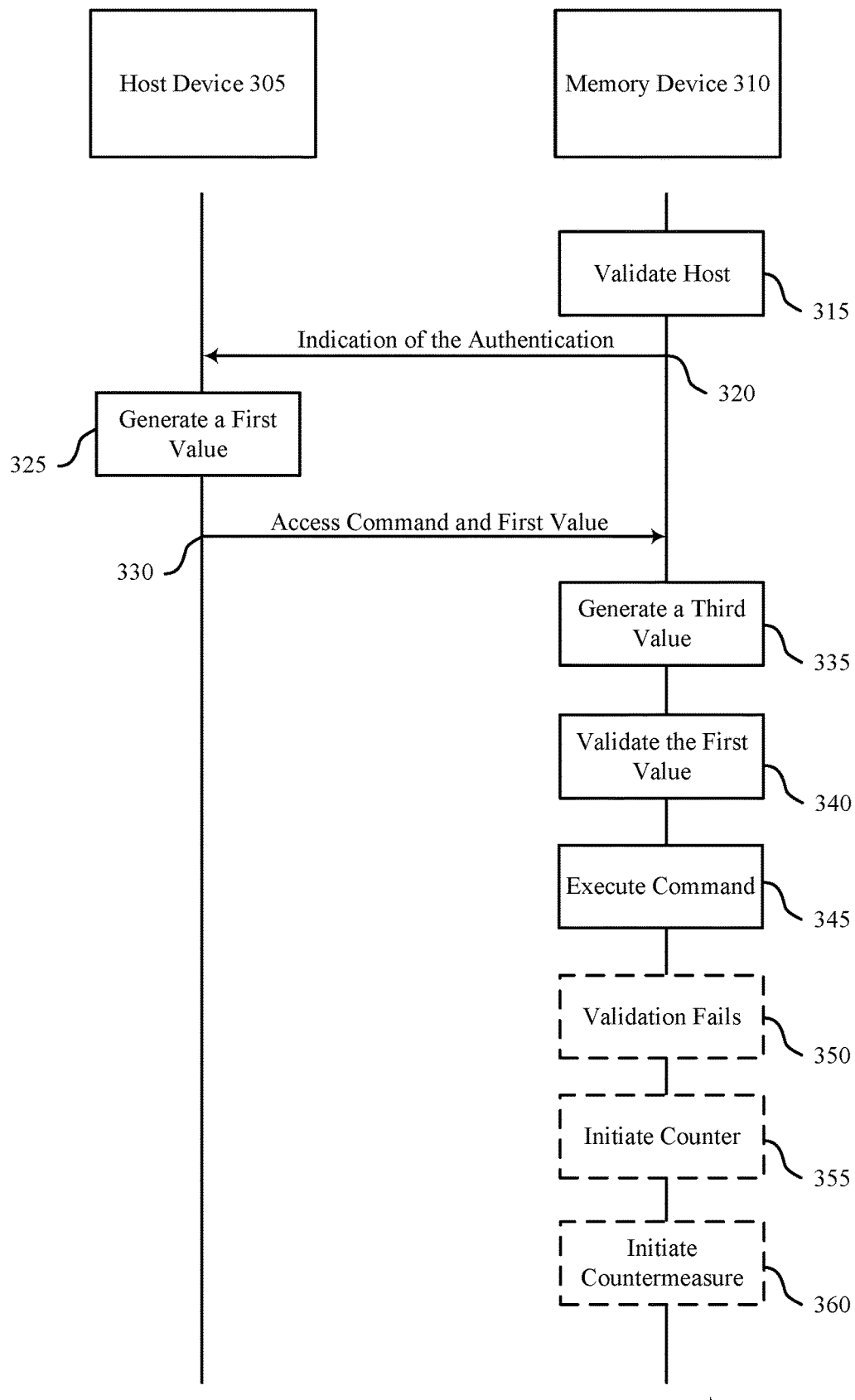
FIG. 3 illustrates an example of a flow diagram that supports host verification for a memory device in accordance with examples as disclosed herein.

FIG. 3 illustrates an example of a flow diagram 300 that supports host verification for a memory device in accordance with examples as disclosed herein. Flow diagram 300 may include host device 305 and memory device 310, which may be respective examples of a host device 105 and a memory device 110 as described with reference to FIG. 1. Although shown in a particular sequence or order, unless otherwise specified, the order of the processes may be modified. Thus, the illustrated examples are used as examples, and the illustrated processes may be performed in a different order, and some processes may be performed in parallel. Additionally, one or more processes may be omitted in various examples. Thus, not all processes are used in every example. Other process flows are possible. The flow diagram 300 illustrates examples for anti-replay techniques for a memory device.

At 315, the memory device 310 may validate the host device 305 as an authorized user by sharing a key between the memory device 310 and the host device 305 as described with reference to FIG. 2. The memory device 310 may enable a functionality (e.g., the second functionality as described with reference to FIG. 2) of the memory device 310 after validating the host device 305.

At 320, the memory device 310 may transmit an indication of the validation of the host device 305 based on validating the host device 305 as an authorized user. In some examples, the memory device 310 may indicate that the functionality is enabled and the memory device 310 is configured to perform some or all types of access operations.

At 325, the host device 305 may generate a first value that is associated with an identification of an access command that is to be transmitted to the memory device 310 as part of an access operation. In some examples, the memory device 310 may be susceptible to a replay attack after validating the host device 305. That is, the memory device 310 may be susceptible to an attacker maliciously or fraudulently replaying (e.g., copying) a valid access command transmitted over a physical bus coupling the memory device 310 and the host device 305—e.g., the attacker may replay the command to modify or steal data from the memory device 310. To mitigate the risk of a replay attack occurring, the host device 305 may generate a unique value (e.g., tag) that comprises a unique bit for each access command transmitted by the host device 305 as a way to identify that the access command is from an authorized user.

In some examples, the host device 305 may generate the first value by utilizing a randomization process. For example, the host device 305 may combine a second value (e.g., the second value (e.g., the random set of bits) as described with reference to FIG. 2) and the secret key and utilize the output as a seed for the randomization process— e.g., the seed may be an initial input that defines the sequence and outputs generated by the randomization process. In some examples, the host device 305 may use a randomization process that includes a linear-feedback shift register (LFSR)—e.g., a shift register whose output is based on the seed value. In other examples, the host device 305 may use a randomization process that includes an algorithm (e.g., a PRNG algorithm).

At 330, the host device 305 may transmit the access command and the first value to the memory device 310 based on generating the first value. In some examples, the host device 305 may transmit the first value parallel to the access command. That is, the host device 305 may utilize unused bits in the access command sequence or unused pins in a channel (e.g., channel 115 as described with reference to FIG. 1) to communicate the first value. In other examples, the host device 305 may transmit the first value in series to the access command. That is, the host device 305 may transmit the access command before transmitting the first value.

At 335, the memory device 310 may generate a third value by utilizing a randomization process after receiving the first value and the access command. In some examples, the memory device 310 may generate the third value to validate (e.g., verify) that the access command is from an authorized user. For example, the memory device 310 may combine the second value and the secret key and utilize the output as a seed of the randomization process. In some examples, the randomization process at the memory device 310 may be synchronized with the host device 305. That is, the memory device 310 may implement the same randomization process utilized at the host device 305 with the same seed. When the randomization process is synchronized, the memory device 310 may generate the same output (e.g., the same value) because the seed utilized at the memory device 310 is the same as the host device 305. For example, the memory device 310 may utilize the same seed when the secret key stored at the host device 305 is the same as the secret key stored at the memory device 310. That is, an unauthorized user or host device 305 may be unable to obtain the secret key stored at the memory device 310. Thus, the unauthorized user or host device 305 may be unable to generate the same output value (e.g., the first value) even if the same randomization process is utilized because the seed used at the memory device 310 and the unauthorized host device 305 is different. In some examples, the memory device 310 may generate the third value with a relatively low latency.

At 340, the memory device 310 may validate the first value by comparing the first value received from the host device 305 with the third value generated by the memory device 310. The memory device 310 may validate that the access command received is from an authorized user if the first value matches the third value. That is, the memory device 310 may determine the host device 305 stores the same secret key based on the first value matching the third value.

At 345, the memory device 310 may execute the access command received from the host device 305 based on validating that the first value matches the third value. By waiting to execute the command until the first value is validated, the memory device 310 may mitigate the risk of a replay attack. That is, a replay attacker may be unable to generate a first value that matches the third value based on the seed utilized by the replay attacker being different that the seed utilized at the memory device 310.

At 350, the memory device 310 may refrain from executing the access command received from the host device 305 based on the first value failing validation. That is, if the memory device 310 determines the first value is different than the third value, the memory device 310 may refrain from validating the host device 305 as an authorized user and thus refrain from executing the access command. By refraining from executing the access command from an unauthorized user or host device 305, the memory device 310 may mitigate the risk of a replay attack.

At 355, the memory device 310 may initiate a counter and increment the counter to a first count value (e.g., one (1)) based on the first value being different than the third value. That is, the memory device 310 may record the quantity of times an unauthorized access command is received. In some examples, the memory device 310 may increment the count value of the counter by a quantity (e.g., one (1)) each time the memory device 310 refrains from validating the host device 305—e.g., a first value associated with an access command received from the host device 305 is different than a third value generated by the memory device 310. For example, if the memory device 310 receives a second access command that includes a first value that is different than the third value, the memory device 310 may refrain from executing the second access command and increment the count value to two (2).

At 360, the memory device 310 may initiate a countermeasure based on the count value of the counter satisfying a predetermined threshold quantity. In some examples, the memory device 310 may program the predetermined threshold quantity to indicate the quantity of invalid access commands (e.g., the first value received being different than the third value generated) received from the host device 305 that are acceptable. In some examples, the predetermined threshold quantity may be dynamic—e.g., the predetermined threshold quantity may adjust based on certain events occurring at the memory device 310. The memory device 310 may lock out the host device 305 from further access based on initiating the countermeasure—e.g., the memory device 310 may disable the functionality of the memory device 310. In other examples, the memory device 310 may set or transmit an alert indicating that the predetermined threshold quantity was satisfied. By initiating the countermeasure, the memory device 310 may prevent an authorized user from modifying or stealing data written to the memory device 310.

Figure 4:
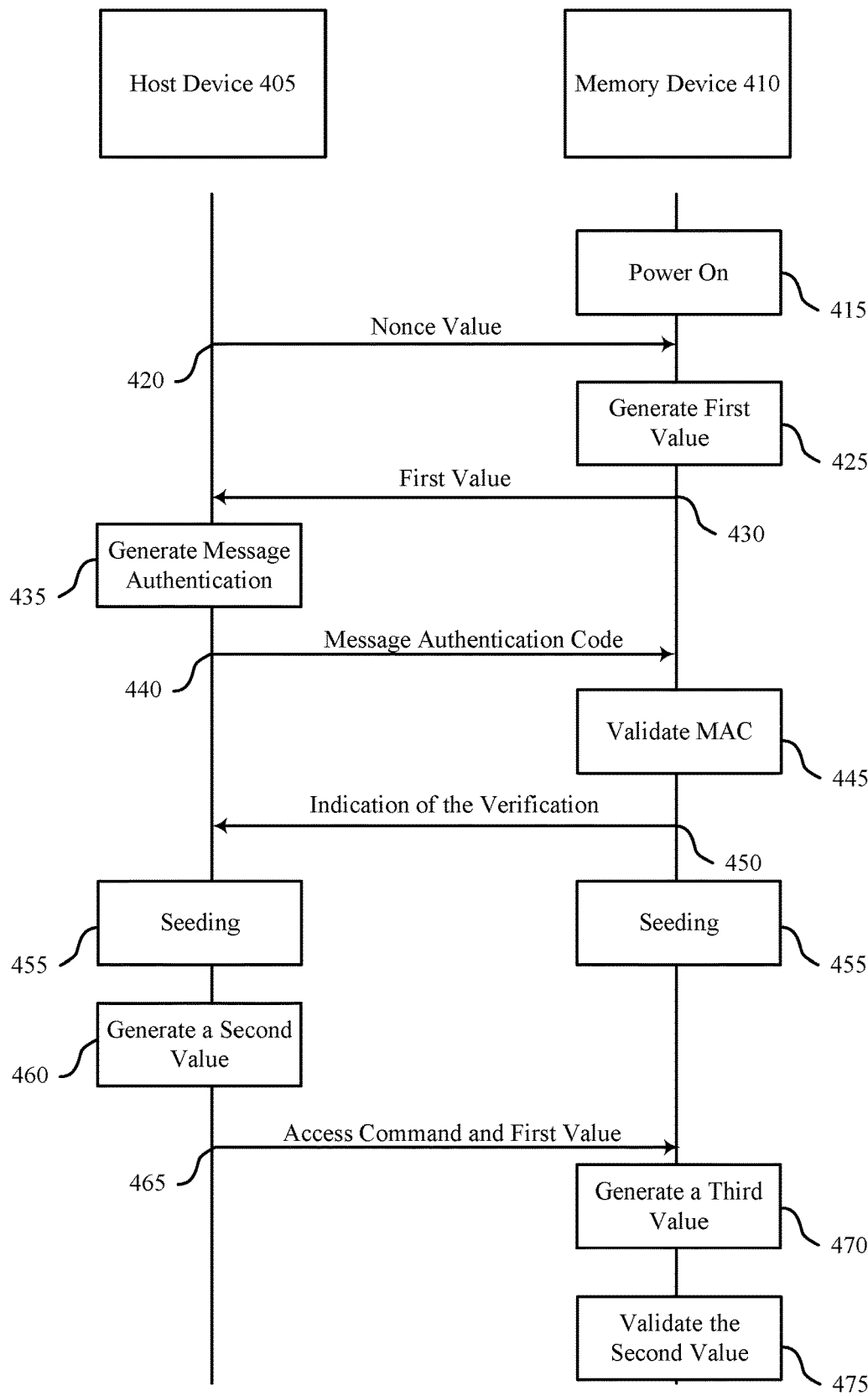
FIG. 4 illustrates an example of a flow diagram that supports host verification for a memory device in accordance with examples as disclosed herein.

FIG. 4 illustrates an example of a flow diagram 400 that supports host verification for a memory device in accordance with examples as disclosed herein. Flow diagram 400 may include host device 405 and memory device 410, which may be respective examples of a host device 105 and a memory device 110 as described with reference to FIG. 1. Although shown in a particular sequence or order, unless otherwise specified, the order of the processes may be modified. Thus, the illustrated examples are used as examples, and the illustrated processes may be performed in a different order, and some processes may be performed in parallel. Additionally, one or more processes may be omitted in various examples. Thus, not all processes are used in every example. Other process flows are possible. The flow diagram 400 illustrates examples for access control techniques and anti-replay techniques for a memory device.

At 415, the memory device 410 may power on from a power down state. In some examples, the main functionality (e.g., logic functionality) of the memory device 410 may be inaccessible to the host device following the power on. For example, the memory device 410 may be in a read-only mode as described with reference to FIG. 2.

At 420, the host device 405 may transmit a nonce value to the memory device 410. For example, the host device 405 may transmit an arbitrary quantity that may be used only once in a communication between the host device 405 and memory device 410 to mitigate risks of a replay attack. In some examples, the host device 405 may generate the nonce value as a random quantity. In other examples, the host device 405 may generate the nonce value as a pseudo-random (e.g., unpredictable) quantity.

At 425, the memory device 410 may generate a first value based on receiving the nonce value from the host device 405. In some examples, the memory device 410 may utilize a randomization process when generating the first value. For example, the memory device 410 may use the nonce value as a seed for a pseudorandom number generator (PRNG) algorithm to generate the first value. In some examples, the memory device 410 may generate the first value to include a pseudo-random quantity. For example, the memory device 410 may generate the first value as a 32-byte pseudo-random quantity based on utilizing the nonce value as the seed for the PRNG algorithm.

At 430, the memory device 410 may transmit the first value to the host device 405 based on generating the first value.

At 435, the host device 405 may generate a message authentication code (MAC) based on receiving the first value from the memory device 410. The host device 405 may utilize an algorithm to generate the MAC. For example, the host device 405 may utilize an HMAC to generate the MAC. That is, the host device 405 may utilize the HMAC to combine the first value and a secret key stored at the host device 405 to generate an encrypted value (e.g., a digital signature).

At 440, the host device 405 may transmit the MAC (e.g., the output of the HMAC algorithm) to the memory device 410 based on generating the MAC.

At 445, the memory device 410 may validate the MAC received from the host device 445. For example, the memory device 410 may generate a second MAC and compare the second MAC with the first MAC. That is, the memory device 410 may utilize the same algorithm as the host device 405 (e.g., the HMAC) to combine the first value generated and a secret key stored at the memory device 410. When the host device 405 is an authorized user of the memory device 410, the secret key of the host device 405 may be the same as the secret key of the memory device 410. That is, the MAC received from the host device 405 may match the second MAC generated by the memory device 410 if the host device 405 and the memory device 410 share the secret key. Thus, to validate the MAC received from the host device 405, the memory device 410 may compare the MAC with the second MAC. The memory device 410 may determine the host device 405 is an authorized user based on the MAC matching the second MAC and enable the main functionality (e.g., logic functionality) of the memory device 410. By waiting to enable the main functionality until the host device 405 is validated, the memory device 410 may mitigate the risk of an unauthorized user modifying or stealing data written to the memory device 410.

At 450, the memory device 410 may transmit an indication of the validation to the host device 405. That is, the memory device 410 may transmit an indication that the memory device 410 has enabled the main functionality and is configured to be accessible by the host device 405 via access commands.

At 455, the memory device 410 and the host device 405 may combine the first value with the shared secret key to generate a seed. In some examples, the memory device 410 and host device 405 may both utilize a same randomization process and use the same seed with the randomization process to generate an output value. For example, the memory device 410 and the host device 405 may utilize an LFSR or a PRNG algorithm to generate the output value from the seed. The randomization process at the host device 405 may thus be synchronized with the memory device 410. That is, if the host device 405 is an authorized user, the output value of the randomization process at the host device 405 may match the output value of the randomization process at the memory device 410. The host device 405 and memory device 410 may generate the output value to identify access commands transmitted by the host device 405 to the memory device 410.

At 460, the host device 405 may generate a second value that is an identification of a first access command to be transmitted to the memory device 410. The host device 405 may generate the second value using the process described at 455—e.g., combine the first value with the shared secret key to generate a seed for a randomization process. The host device 405 may then utilize the randomization process to generate the second value.

At 465, the host device 405 may transmit the first access command and the second value to the memory device 410. As described with reference to FIG. 3, the second value may be transmitted in parallel or in series with the first access command.

At 470, the memory device 410 may generate a third value that is an identification of the first access command. The memory device 410 may generate the third value using the process described at 455—e.g., combine the first value with the shared secret key to generate a seed for a randomization process. The memory device 410 may then utilize the randomization process to generate the third value.

At 475, the memory device 410 may validate the second value by comparing the second value received from the host device 405 with the third value generated. When the host device 405 is an authorized user, the second value may match the third value because of the synchronized randomization process described with reference to 455. The memory device 410 may execute the first access command when the second value matches the third value. By waiting to execute the command until validating the second value associated with the identification of the first access command, the memory device 410 may mitigate the risk of a replay attack occurring.

In other examples, the memory device 410 may determine the second value is different than the third value. In such examples, the memory device 410 may refrain from executing the first access command. The memory device 410 may also initiate a counter and countermeasures (e.g., a counter and countermeasure as described with reference to FIG. 3 at 355 and 360) when the second value is different than the third value. By implementing the counter and the countermeasures, the memory device 410 may mitigate the risk of a set of data written to the memory device 410 being modified or stolen.

Figure 5:
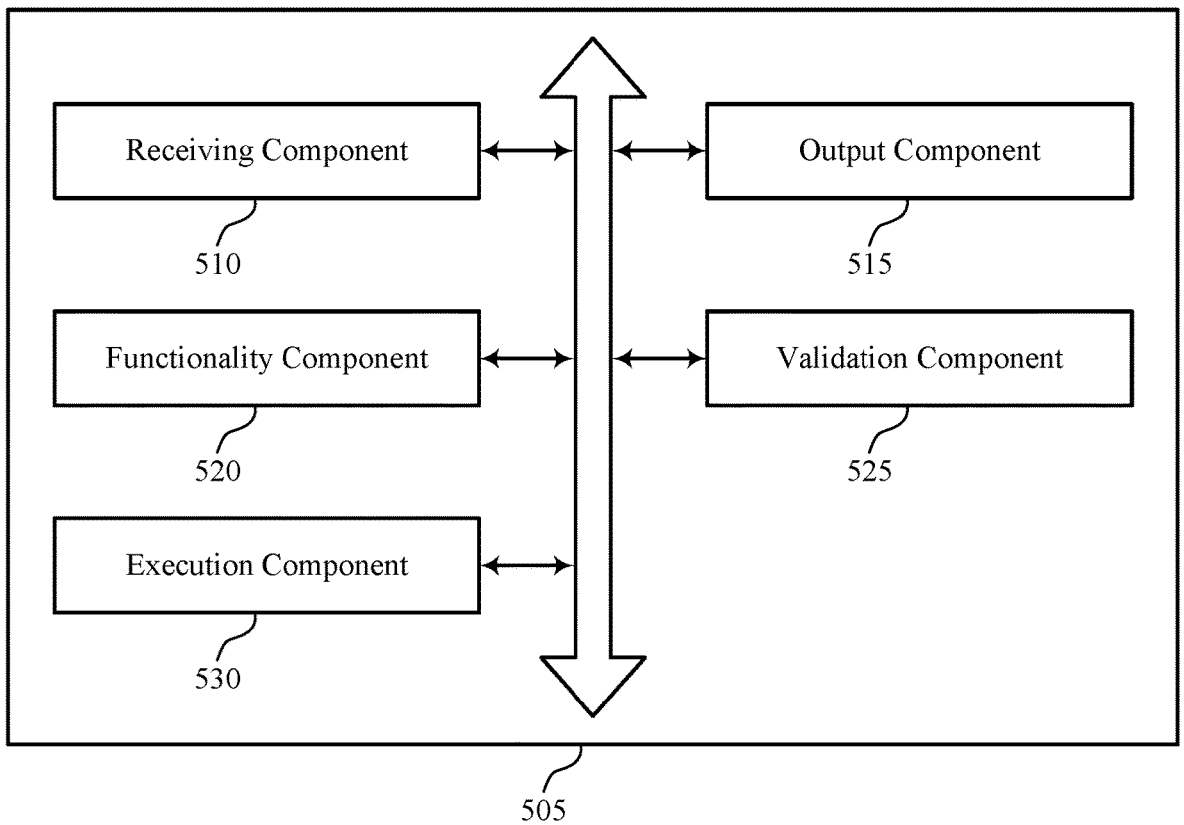
FIG. 5 shows a block diagram of a memory device that supports host verification for a memory device in accordance with examples as disclosed herein.

FIG. 5 shows a block diagram 500 of a memory device 505 that supports host verification for a memory device in accordance with examples as disclosed herein. The memory device 505 may be an example of aspects of a memory device as described with reference to FIGS. 1-4. The memory device 505 may include a receiving component 510, an output component 515, a functionality component 520, a validation component 525, and an execution component 530. Each of these modules may communicate, directly or indirectly, with one another (e.g., via one or more buses).

The receiving component 510 may receive, from a host device at a memory device, a first value that is associated with an identification of the host device after an event. In some examples, the receiving component 510 may receive, from the host device at the memory device, data or a command that includes an encrypted third value that is based on the second value and a secret shared between the host device and the memory device. In some cases, the receiving component 510 may receive, from the host device at the memory device, an access command and a fourth value associated with the access command based on enabling the functionality of the memory device. In some instances, the receiving component 510 may receive, from the host device, an encrypted fourth value after a second event.

The output component 515 may transmit, to the host device from the memory device, a second value that is based on the first value and includes a random set of bits. In some examples, the output component 515 may transmit an alert based on determining that the first count value satisfies the threshold value.

The functionality component 520 may enable a functionality of the memory device based on the encrypted third value. In some examples, the functionality component 520 may disable the functionality of the memory device based on determining that the first count value satisfies the threshold value and determining that the encrypted fourth value is different than the stored value. In some cases, the functionality component 520 may disable the functionality of the memory device before a process associated with the event is completed. In some cases, the memory device includes an array of memory cells that each include capacitive storage elements, resistive storage elements, polarization storage elements, other types of storage elements, or a combination thereof.

The validation component 525 may validate the access command as being from an authorized host device based on comparing the fourth value with a fifth value generated at the memory device using a randomization process that is based on a random quantity and the secret shared between the host device and the memory device after receiving the fourth value. In some examples, the validation component 525 may seed the randomization process used to generate the fifth value with the second value transmitted to the host device, where generating the fifth value is based on seeding the randomization process. In some cases, the validation component 525 may generate, at the memory device, the second value using a randomization process based on the first value before transmitting the second value. In some instances, the validation component 525 may validate the host device as an authorized user of the memory device based on the encrypted third value. In some examples, the validation component 525 may compare the encrypted third value with a stored value generated by an algorithm based on receiving the encrypted third value. In some cases, the validation component 525 may determine that the encrypted third value matches the stored value based on the comparison, where enabling the functionality of the memory device is based on determining that the encrypted third value matches the stored value.

In some instances, the validation component 525 may compare the encrypted fourth value with a stored value generated by an algorithm based on receiving the encrypted fourth value. In some examples, the validation component 525 may determine that the encrypted fourth value is different than the stored value based on the comparison. In some cases, the validation component 525 may refrain from validating the host device based on determining that the encrypted fourth value is different than the stored value. In some instances, the validation component 525 may increment a counter associated with the encrypted third value to a first count value based on determining that the encrypted fourth value is different than the stored value. In some examples, the validation component 525 may determine that the first count value satisfies a threshold value based on the comparison.

In some cases, the validation component 525 may use the randomization process which includes a process implemented by a linear-feedback shift register, an algorithm generated by a pseudorandom number generator, or any combination thereof. In some cases, the randomization process used by the validation component 525 is seeded with the second value and a secret key shared between the host device and the memory device. In some cases, the validation component 525 may use the encrypted third value which includes a message authentication code. The execution component 530 may execute the access command based on validating the access command. In some cases, the execution component 530 may transition from a first power mode to a second power mode during the event.

Figure 6:
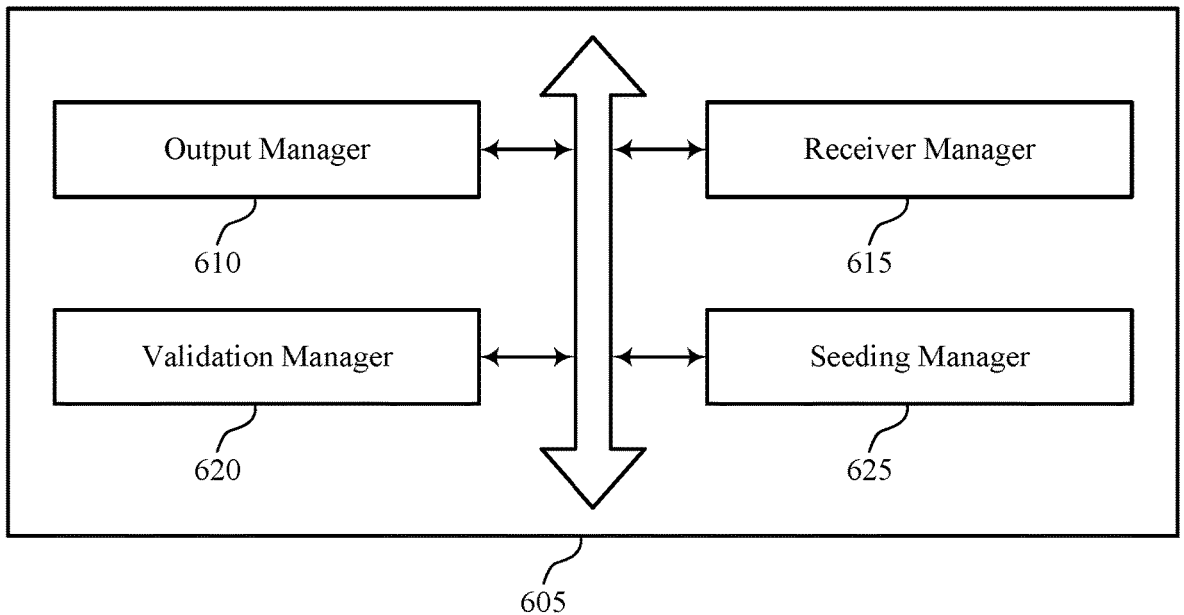
FIG. 6 shows a block diagram of a host device that supports host verification for a memory device in accordance with examples as disclosed herein.

FIG. 6 shows a block diagram 600 of a host device 605 that supports host verification for a memory device in accordance with examples as disclosed herein. The host device 605 may be an example of aspects of a host device as described with reference to FIGS. 1-4. The host device 605 may include an output manager 610, a receiver manager 615, a validation manager 620, and a seeding manager 625. Each of these modules may communicate, directly or indirectly, with one another (e.g., via one or more buses).

The output manager 610 may transmit, to a memory device, a first value that is associated with an identification of a host device after an event. In some examples, the output manager 610 may transmit to the memory device, data or a command that includes an encrypted third value that is generated by the host device based on receiving the second value. In some examples, the output manager 610 may transmit the access command and the fourth to the memory device based on generating the fourth value.

The receiver manager 615 may receive, from the memory device, a second value based on transmitting the first value. In some examples, the receiver manager 615 may receive an indication of the memory device enabling a functionality based on transmitting the encrypted third value. In some cases, the receiver manager 615 may receive a second indication of an execution of the access command from the memory device that is based on the memory device validating the fourth value as being from an authorized user and transmitting the access command.

The validation manager 620 may generate a fourth value associated with an access command using a randomization process that is based on a random quantity and a secret shared between the host device and the memory device based on receiving the indication. In some examples, the validation manager 620 may generate, at the host device, the encrypted third value using a randomization process based on the first value after receiving the second value. The seeding manager 625 may seed the randomization process used to generate the fourth value with the second value received from the memory device, where generating the fourth value is based on seeding the randomization process. In some cases, the randomization process used by the seeding manager 625 includes a process implemented by a linear-feedback shift register, an algorithm generated by a pseudorandom number generator, or any combination thereof. In some cases, the randomization process used by the seeding manager 625 is seeded with the second value and a secret key shared between the host device and the memory device.

Figure 7:
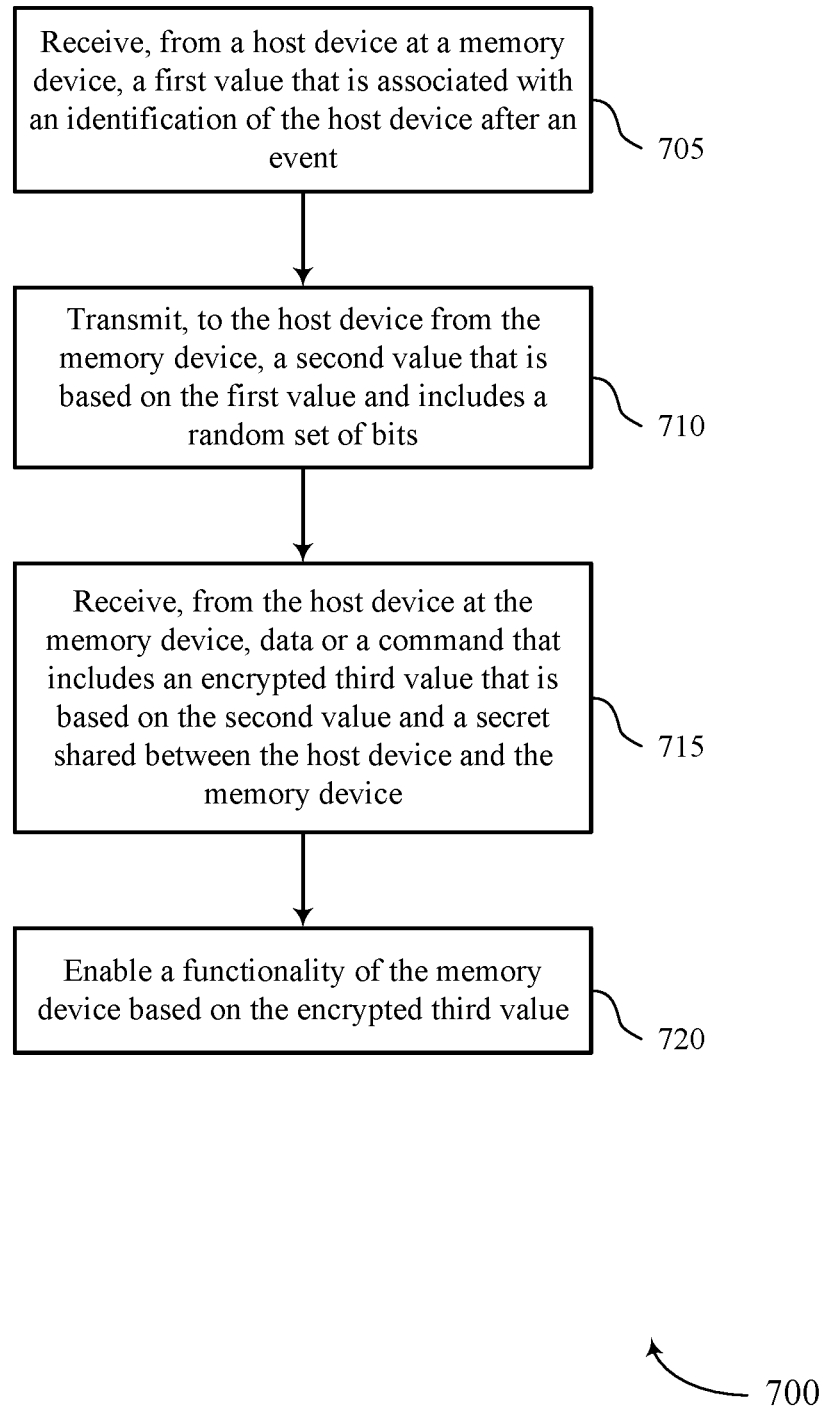
FIGS. 7 through 10 show flowcharts illustrating a method or methods that support host verification for a memory device in accordance with examples as disclosed herein.

FIG. 7 shows a flowchart illustrating a method or methods 700 that supports host verification for a memory device in accordance with examples as disclosed herein. The operations of method 700 may be implemented by a memory device or its components as described herein. For example, the operations of method 700 may be performed by a memory device as described with reference to FIG. 5. In some examples, a memory device may execute a set of instructions to control the functional elements of the memory device to perform the described functions. Additionally or alternatively, a memory device may perform aspects of the described functions using special-purpose hardware.

At 705, the memory device may receive, from a host device at a memory device, a first value that is associated with an identification of the host device after an event. The operations of 705 may be performed according to the methods described with reference to FIGS. 2-4. In some examples, aspects of the operations of 705 may be performed by a receiving component as described with reference to FIG. 5.

At 710, the memory device may transmit, to the host device from the memory device, a second value that is based on the first value and includes a random set of bits. The operations of 710 may be performed according to the methods described with reference to FIGS. 2-4. In some examples, aspects of the operations of 710 may be performed by an output component as described with reference to FIG. 5.

At 715, the memory device may receive, from the host device at the memory device, data or a command that includes an encrypted third value that is based on the second value and a secret shared between the host device and the memory device. The operations of 715 may be performed according to the methods described with reference to FIGS. 2-4. In some examples, aspects of the operations of 715 may be performed by a receiving component as described with reference to FIG. 5.

At 720, the memory device may enable a functionality of the memory device based on the encrypted third value. The operations of 720 may be performed according to the methods described with reference to FIGS. 2-4. In some examples, aspects of the operations of 720 may be performed by a functionality component as described with reference to FIG. 5.

In some examples, an apparatus as described herein may perform a method or methods, such as the method 700. The apparatus may include features, means, or instructions (e.g., a non-transitory computer-readable medium storing instructions executable by a processor) for receiving, from a host device at a memory device, a first value that is associated with an identification of the host device after an event, transmitting, to the host device from the memory device, a second value that is based on the first value and includes a random set of bits, receiving, from the host device at the memory device, data or a command that includes an encrypted third value that is based on the second value and a secret shared between the host device and the memory device, and enabling a functionality of the memory device based on the encrypted third value.

Some cases of the method 700 and the apparatus described herein may further include operations, features, means, or instructions for receiving, from the host device at the memory device, an access command and a fourth value associated with the access command based on enabling the functionality of the memory device, validating the access command as being from an authorized host device based on comparing the fourth value with a fifth value generated at the memory device using a randomization process that may be based on a random quantity and the secret shared between the host device and the memory device after receiving the fourth value, and executing the access command based on validating the access command.

Some instances of the method 700 and the apparatus described herein may further include operations, features, means, or instructions for seeding the randomization process used to generate the fifth value with the second value transmitted to the host device, where generating the fifth value may be based on seeding the randomization process.

In some examples of the method 700 and the apparatus described herein, the randomization process includes a process implemented by a linear-feedback shift register, an algorithm generated by a pseudorandom number generator, or any combination thereof.

In some cases of the method 700 and the apparatus described herein, the randomization process may be seeded with the second value and a secret key shared between the host device and the memory device.

Some instances of the method 700 and the apparatus described herein may further include operations, features, means, or instructions for generating, at the memory device, the second value using a randomization process based on the first value before transmitting the second value.

Some examples of the method 700 and the apparatus described herein may further include operations, features, means, or instructions for validating the host device as an authorized user of the memory device based on the encrypted third value.

Some cases of the method 700 and the apparatus described herein may further include operations, features, means, or instructions for comparing the encrypted third value with a stored value generated by an algorithm based on receiving the encrypted third value, and determining that the encrypted third value matches the stored value based on the comparison, where enabling the functionality of the memory device may be based on determining that the encrypted third value matches the stored value.

Some instances of the method 700 and the apparatus described herein may further include operations, features, means, or instructions for receiving, from the host device, an encrypted fourth value after a second event, comparing the encrypted fourth value with a stored value generated by an algorithm based on receiving the encrypted fourth value, determining that the encrypted fourth value may be different than the stored value based on the comparison, and refraining from validating the host device based on determining that the encrypted fourth value may be different than the stored value.

Some examples of the method 700 and the apparatus described herein may further include operations, features, means, or instructions for incrementing a counter associated with the encrypted third value to a first count value based on determining that the encrypted fourth value may be different than the stored value, and determining that the first count value satisfies a threshold value based on the comparison.

Some cases of the method 700 and the apparatus described herein may further include operations, features, means, or instructions for disabling the functionality of the memory device based on determining that the first count value satisfies the threshold value and determining that the encrypted fourth value may be different than the stored value.

Some instances of the method 700 and the apparatus described herein may further include operations, features, means, or instructions for transmitting an alert based on determining that the first count value satisfies the threshold value.

In some examples of the method 700 and the apparatus described herein, the encrypted third value includes a message authentication code.

In some cases of the method 700 and the apparatus described herein, the event includes transitioning from a first power mode to a second power mode.

Some instances of the method 700 and the apparatus described herein may further include operations, features, means, or instructions for disabling the functionality of the memory device before a process associated with the event may be completed.

In some examples of the method 700 and the apparatus described herein, the memory device includes an array of memory cells that each include capacitive storage elements, resistive storage elements, polarization storage elements, other types of storage elements, or a combination thereof.

Figure 8:
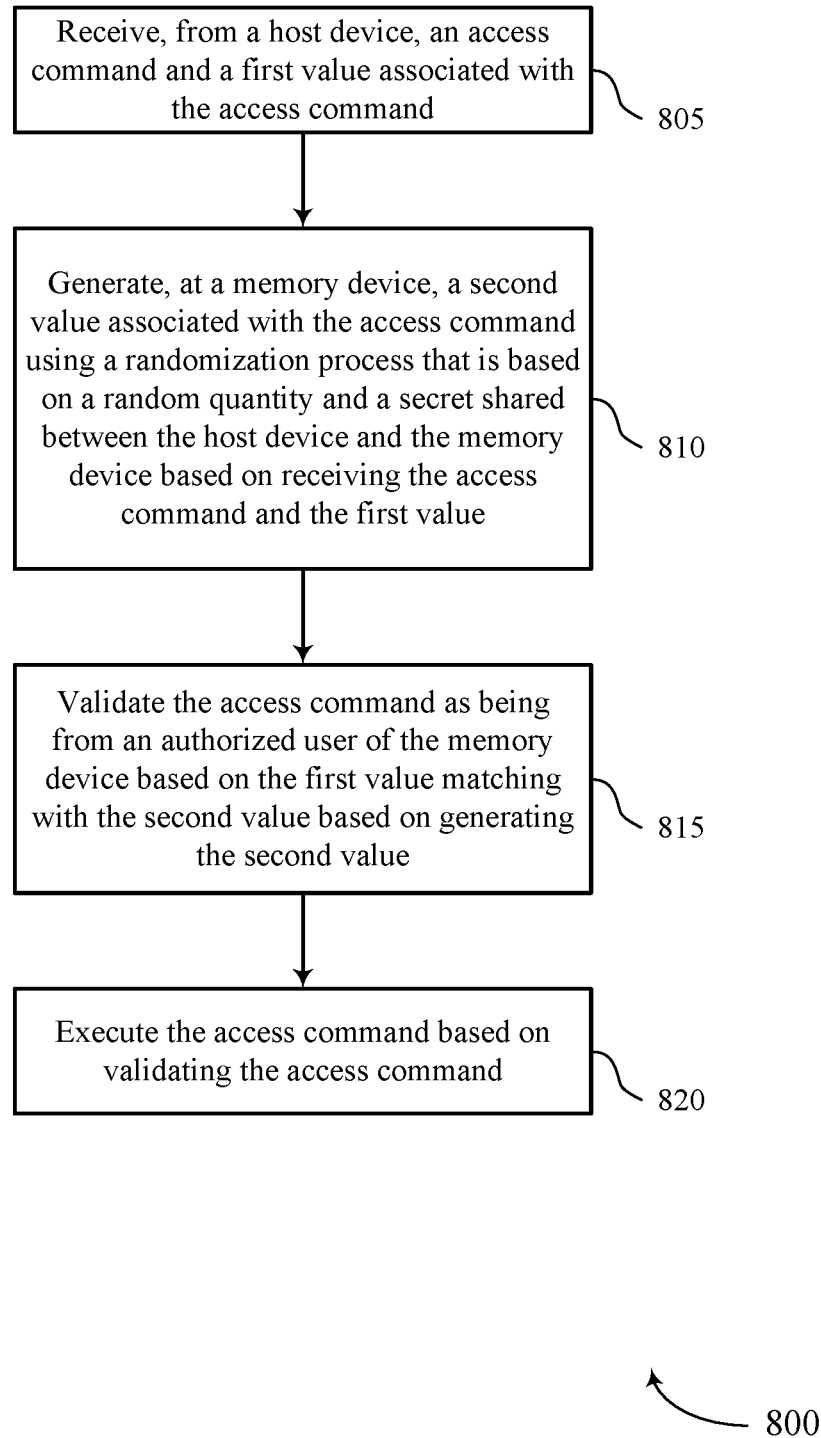

FIG. 8 shows a flowchart illustrating a method or methods 800 that supports host verification for a memory device in accordance with examples as disclosed herein. The operations of method 800 may be implemented by a memory device or its components as described herein. For example, the operations of method 800 may be performed by a memory device as described with reference to FIG. 5. In some examples, a memory device may execute a set of instructions to control the functional elements of the memory device to perform the described functions. Additionally or alternatively, a memory device may perform aspects of the described functions using special-purpose hardware.

At 805, the memory device may receive, from a host device, an access command and a first value associated with the access command. The operations of 805 may be performed according to the methods described with reference to FIGS. 3 and 4. In some examples, aspects of the operations of 805 may be performed by a undefined as described with reference to FIG. 5.

At 810, the memory device may generate, at a memory device, a second value associated with the access command using a randomization process that is based on a random quantity and a secret shared between the host device and the memory device based on receiving the access command and the first value. The operations of 810 may be performed according to the methods described with reference to FIGS. 3 and 4. In some examples, aspects of the operations of 810 may be performed by a undefined as described with reference to FIG. 5.

At 815, the memory device may validate the access command as being from an authorized user of the memory device based on the first value matching with the second value based on generating the second value. The operations of 815 may be performed according to the methods described with reference to FIGS. 3 and 4. In some examples, aspects of the operations of 815 may be performed by a undefined as described with reference to FIG. 5.

At 820, the memory device may execute the access command based on validating the access command. The operations of 820 may be performed according to the methods described with reference to FIGS. 3 and 4. In some examples, aspects of the operations of 820 may be performed by a undefined as described with reference to FIG. 5.

In some examples, an apparatus as described herein may perform a method or methods, such as the method 800. The apparatus may include features, means, or instructions (e.g., a non-transitory computer-readable medium storing instructions executable by a processor) for receiving, from a host device, an access command and a first value associated with the access command, generating, at a memory device, a second value associated with the access command using a randomization process that is based on a random quantity and a secret shared between the host device and the memory device based on receiving the access command and the first value, validating the access command as being from an authorized user of the memory device based on the first value matching with the second value based on generating the second value, and executing the access command based on validating the access command.

Some examples of the method 800 and the apparatus described herein may further include operations, features, means, or instructions for validating the host device as the authorized user based on the secret shared between the host device and the memory device, where receiving the access command may be based on validating the host device.

In some examples of the method 800 and the apparatus described herein, the randomization process at the memory device may be synchronized with a second randomization process at the host device using a seed value.

Some examples of the method 800 and the apparatus described herein may further include operations, features, means, or instructions for receiving, from the host device, a second access command a third value associated with the second access command, generating a fourth value associated with the second access command using the randomization process based on receiving the second access command with the third value, determining the fourth value may be different than the third value based on generating the fourth value, and refraining from executing the second access command based on determining that the fourth value may be different than the third value.

Some examples of the method 800 and the apparatus described herein may further include operations, features, means, or instructions for initializing a counter based on determining that the fourth value may be different than the third value, and incrementing the counter to a first count value based on initializing the counter and determining that the fourth value may be different than the third value.

Some examples of the method 800 and the apparatus described herein may further include operations, features, means, or instructions for comparing the first count value of the counter with a threshold value based on incrementing the counter to the first count value, determining that the first count value satisfies the threshold value based on the comparison, and disabling a functionality of the memory device based on determining the first count value satisfies the threshold value.

In some examples of the method 800 and the apparatus described herein, the access command and the first value may be received concurrently.

Figure 9:
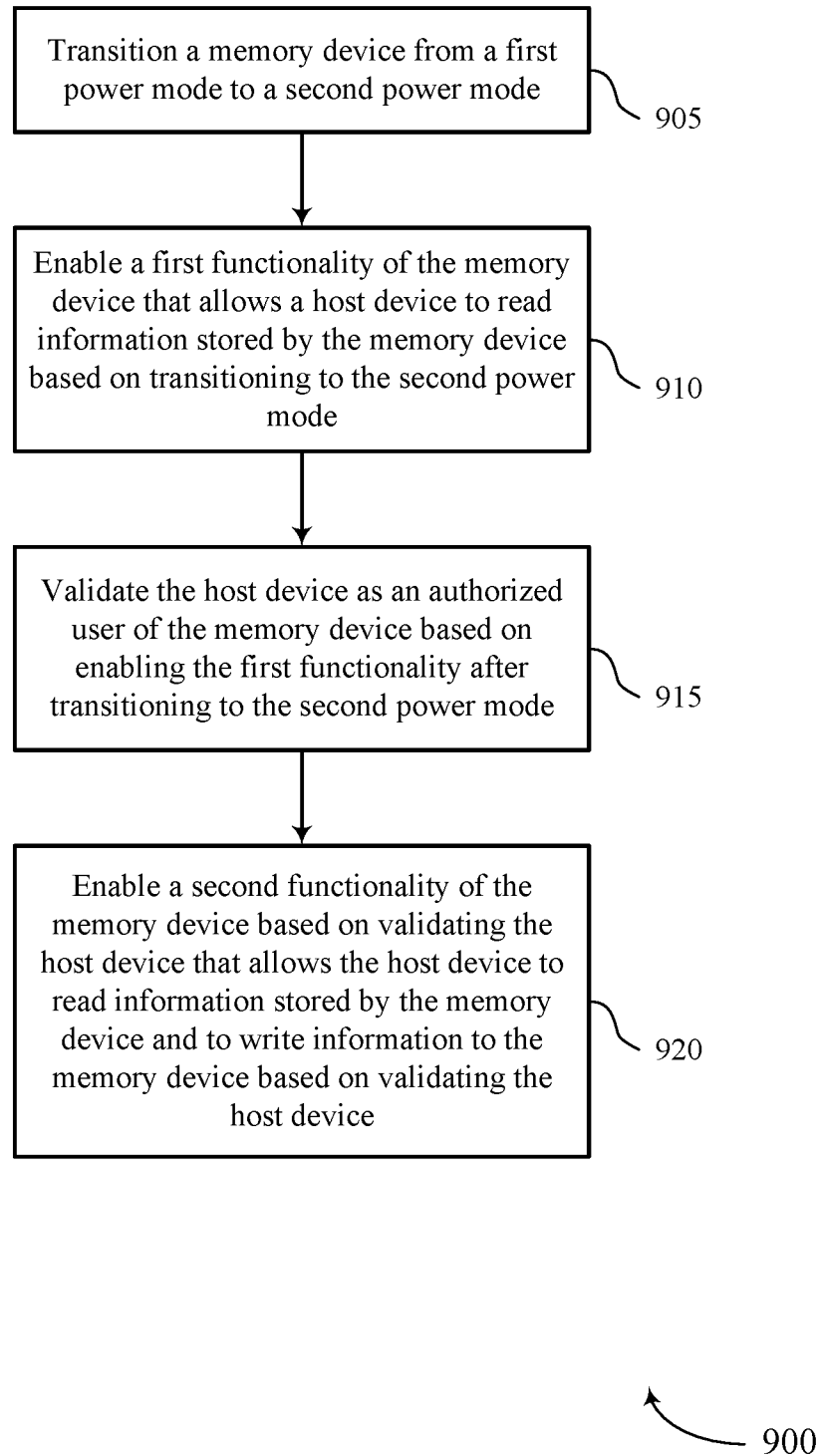

FIG. 9 shows a flowchart illustrating a method or methods 900 that supports host verification for a memory device in accordance with examples as disclosed herein. The operations of method 900 may be implemented by a memory device or its components as described herein. For example, the operations of method 900 may be performed by a memory device as described with reference to FIG. 5. In some examples, a memory device may execute a set of instructions to control the functional elements of the memory device to perform the described functions. Additionally or alternatively, a memory device may perform aspects of the described functions using special-purpose hardware.

At 905, the memory device may transition a memory device from a first power mode to a second power mode. The operations of 905 may be performed according to the methods described with reference to FIG. 2. In some examples, aspects of the operations of 905 may be performed by a undefined as described with reference to FIG. 5.

At 910, the memory device may enable a first functionality of the memory device that allows a host device to read information stored by the memory device based on transitioning to the second power mode. The operations of 910 may be performed according to the methods described with reference to FIG. 2. In some examples, aspects of the operations of 910 may be performed by a undefined as described with reference to FIG. 5.

At 915, the memory device may validate the host device as an authorized user of the memory device based on enabling the first functionality after transitioning to the second power mode. The operations of 915 may be performed according to the methods described with reference to FIG. 2. In some examples, aspects of the operations of 915 may be performed by a undefined as described with reference to FIG. 5.

At 920, the memory device may enable a second functionality of the memory device based on validating the host device that allows the host device to read information stored by the memory device and to write information to the memory device based on validating the host device. The operations of 920 may be performed according to the methods described with reference to FIG. 2. In some examples, aspects of the operations of 920 may be performed by a undefined as described with reference to FIG. 5.

In some examples, an apparatus as described herein may perform a method or methods, such as the method 900. The apparatus may include features, means, or instructions (e.g., a non-transitory computer-readable medium storing instructions executable by a processor) for transitioning a memory device from a first power mode to a second power mode, enabling a first functionality of the memory device that allows a host device to read information stored by the memory device based on transitioning to the second power mode, validating the host device as an authorized user of the memory device based on enabling the first functionality after transitioning to the second power mode, and enabling a second functionality of the memory device based on validating the host device that allows the host device to read information stored by the memory device and to write information to the memory device based on validating the host device.

Some examples of the method 900 and the apparatus described herein may further include operations, features, means, or instructions for validating the host device may be based on a secret shared between the memory device and the host device.

Some examples of the method 900 and the apparatus described herein may further include operations, features, means, or instructions for transitioning the memory device from the second power mode to the first power mode after an event, transitioning the memory device from the first power mode to the second power mode after a second event, enabling the first functionality of the memory device based on transitioning to the second power mode after the second event, refraining from validating the host device based on enabling the first functionality and after transitioning to the second power mode after the second event, and refraining from enabling the second functionality of the memory device based on refraining from validating the host device.

In some examples of the method 900 and the apparatus described herein, the first power mode may be associated with a power off state of the memory device and the second power mode may be associated with a power on state of the memory device.

In some examples of the method 900 and the apparatus described herein, the first power mode may be associated with a low power state and the second power mode may be associated with a high power state.

Some examples of the method 900 and the apparatus described herein may further include operations, features, means, or instructions for transitioning from the first power mode to the second power mode may be associated with a reset operation of the memory device.

Figure 10:
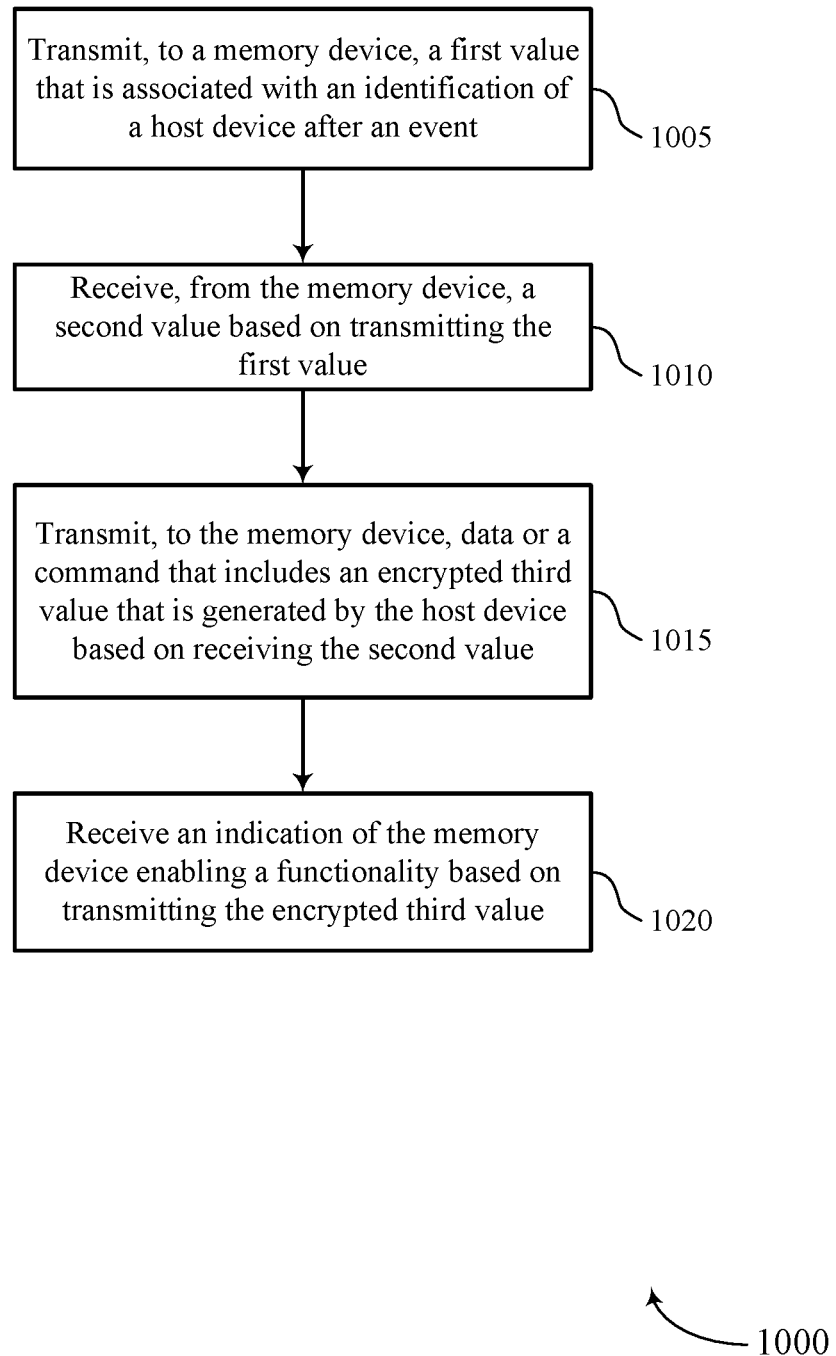

FIG. 10 shows a flowchart illustrating a method or methods 1000 that supports host verification for a memory device in accordance with examples as disclosed herein. The operations of method 1000 may be implemented by a host device or its components as described herein. For example, the operations of method 1000 may be performed by a host device as described with reference to FIG. 6. In some examples, a host device may execute a set of instructions to control the functional elements of the host device to perform the described functions. Additionally or alternatively, a host device may perform aspects of the described functions using special-purpose hardware.

At 1005, the host device may transmit, to a memory device, a first value that is associated with an identification of a host device after an event. The operations of 1005 may be performed according to the methods described with reference to FIGS. 2-4. In some examples, aspects of the operations of 1005 may be performed by an output manager as described with reference to FIG. 6.

At 1010, the host device may receive, from the memory device, a second value based on transmitting the first value. The operations of 1010 may be performed according to the methods described with reference to FIGS. 2-4. In some examples, aspects of the operations of 1010 may be performed by a receiver manager as described with reference to FIG. 6.

At 1015, the host device may transmit, to the memory device, data or a command that includes an encrypted third value that is generated by the host device based on receiving the second value. The operations of 1015 may be performed according to the methods described with reference to FIGS. 2-4. In some examples, aspects of the operations of 1015 may be performed by an output manager as described with reference to FIG. 6.

At 1020, the host device may receive an indication of the memory device enabling a functionality based on transmitting the encrypted third value. The operations of 1020 may be performed according to the methods described with reference to FIGS. 2-4. In some examples, aspects of the operations of 1020 may be performed by a receiver manager as described with reference to FIG. 6.

In some examples, an apparatus as described herein may perform a method or methods, such as the method 1000. The apparatus may include features, means, or instructions (e.g., a non-transitory computer-readable medium storing instructions executable by a processor) for transmitting, to a memory device, a first value that is associated with an identification of a host device after an event, receiving, from the memory device, a second value based on transmitting the first value, transmitting, to the memory device, data or a command that includes an encrypted third value that is generated by the host device based on receiving the second value, and receiving an indication of the memory device enabling a functionality based on transmitting the encrypted third value.

Some examples of the method 1000 and the apparatus described herein may further include operations, features, means, or instructions for generating a fourth value associated with an access command using a randomization process that may be based on a random quantity and a secret shared between the host device and the memory device based on receiving the indication, transmitting the access command and the fourth to the memory device based on generating the fourth value, and receiving a second indication of an execution of the access command from the memory device that may be based on the memory device validating the fourth value as being from an authorized user and transmitting the access command.

Some examples of the method 1000 and the apparatus described herein may further include operations, features, means, or instructions for seeding the randomization process used to generate the fourth value with the second value received from the memory device, where generating the fourth value may be based on seeding the randomization process.

In some examples of the method 1000 and the apparatus described herein, the randomization process includes a process implemented by a linear-feedback shift register, an algorithm generated by a pseudorandom number generator, or any combination thereof.

In some examples of the method 1000 and the apparatus described herein, the randomization process may be seeded with the second value and a secret key shared between the host device and the memory device.

Some examples of the method 1000 and the apparatus described herein may further include operations, features, means, or instructions for generating, at the host device, the encrypted third value using a randomization process based on the first value after receiving the second value.

It should be noted that the methods described herein describe possible implementations, and that the operations and the steps may be rearranged or otherwise modified and that other implementations are possible. Further, portions from two or more of the methods may be combined.

An apparatus is described. The apparatus may include a memory device including a memory array, a controller coupled with the memory array and configured to cause the apparatus to, transmit a second value to the host device that is based on the first value and includes a random set of bits, receive data or a command that includes an encrypted third value from the host device based on the second value, and enable a functionality of the memory device based on the encrypted third value.

In some cases, the controller may be further configured to receive, from the host device, an access command and a fourth value associated with the access command based on enabling the functionality of the memory device, validating the access command as being from an authorized host device based on comparing the fourth value with a fifth value generated using a randomization process that may be based on a random quantity and a secret shared between the host device and the memory device after receiving the fourth value, and executing the access command based on validating the access command.

In some examples, the controller may be further configured to compare the encrypted third with a stored value generated by an algorithm based on receiving the encrypted third value, and determine that the encrypted third value matches the stored value based on the comparison, where the controller may be configured to validate the host device based on determining that the encrypted third value matches the stored value.

In some instances, the controller may be further configured to receive, from the host device, an encrypted fourth value after a second event, compare the encrypted fourth value with a stored value generated by an algorithm based on receiving the encrypted fourth value, determine that the encrypted fourth value may be different than the stored value based on the comparison, and refrain from validating the host device based on determining that the encrypted fourth value may be different than the stored value.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
    receiving, from a host device at a memory device, a first value that is associated with an identification of the host device after a transition from a first power mode of the memory device to a first functionality mode of a second power mode of the memory device, the second power mode comprising the first functionality mode and a second functionality mode, wherein the first functionality mode enables the host device to perform read-only operations on the memory device and the second functionality mode enables the host device to perform read operations and write operations on the memory device;
    receiving, from the host device, an access command, the access command being associated with a write operation on the memory device;
    suspending executing the access command based at least in part on the memory device operating in the first functionality mode;
    transmitting, to the host device from the memory device, a second value that is based at least in part on the first value and comprises a random set of bits;
    receiving, from the host device at the memory device, data or a command that comprises an encrypted third value that is based at least in part on the second value and a secret shared between the host device and the memory device;
    enabling the second functionality mode of the second power mode of the memory device based at least in part on the encrypted third value; and
    ceasing suspension of the access command based at least in part on enabling the second functionality mode.

2. The method of claim 1, further comprising:
    receiving, from the host device at the memory device, an access command and a fourth value associated with the access command based at least in part on enabling the second functionality mode of the memory device;

validating the access command as being from an authorized host device based at least in part on comparing the fourth value with a fifth value generated at the memory device using a randomization process that is based at least in part on a random quantity and the secret shared between the host device and the memory device after receiving the fourth value; and executing the access command based at least in part on validating the access command.

3. The method of claim 2, further comprising:

seeding the randomization process used to generate the fifth value with the second value transmitted to the host device, wherein generating the fifth value is based at least in part on seeding the randomization process.

4. The method of claim 3, wherein the randomization process comprises a process implemented by a linear-feedback shift register, an algorithm generated by a pseudorandom number generator, or any combination thereof.

5. The method of claim 3, wherein the randomization process is seeded with the second value and a secret key shared between the host device and the memory device.

6. The method of claim 1, further comprising:

generating, at the memory device, the second value using a randomization process on the first value before transmitting the second value.

7. The method of claim 1, further comprising:

validating the host device as an authorized user of the memory device based at least in part on the encrypted third value.

8. The method of claim 1, further comprising:

comparing the encrypted third value with a stored value generated by an algorithm based at least in part on receiving the encrypted third value; and determining that the encrypted third value matches the stored value based at least in part on the comparison, wherein enabling the second functionality mode of the memory device is based at least in part on determining that the encrypted third value matches the stored value.

9. The method of claim 1, further comprising:

receiving, from the host device, an encrypted fourth value after an event;

comparing the encrypted fourth value with a stored value generated by an algorithm based at least in part on receiving the encrypted fourth value;

determining that the encrypted fourth value is different than the stored value based at least in part on the comparison; and refraining from validating the host device based at least in part on determining that the encrypted fourth value is different than the stored value.

10. The method of claim 9, further comprising:

incrementing a counter associated with the encrypted third value to a first count value based at least in part on determining that the encrypted fourth value is different than the stored value; and determining that the first count value satisfies a threshold value based at least in part on the comparison.

11. The method of claim 10, further comprising:

disabling the second functionality mode of the memory device based at least in part on determining that the first count value satisfies the threshold value and determining that the encrypted fourth value is different than the stored value.

12. The method of claim 10, further comprising:

transmitting an alert based at least in part on determining that the first count value satisfies the threshold value.

13. The method of claim 1, wherein the encrypted third value comprises a message authentication code.

14. The method of claim 1, further comprising:

disabling the second functionality mode of the memory device before a process associated with the transition is completed.

15. The method of claim 1, wherein the memory device comprises an array of memory cells that each comprise capacitive storage elements, resistive storage elements, polarization storage elements, other types of storage elements, or a combination thereof.

16. A method, comprising:

transitioning a memory device from a first power mode to a first functionality mode of a second power mode, the second power mode comprising the first functionality mode and a second functionality mode, wherein the first functionality mode enables a host device to perform read-only operations on the memory device and the second functionality mode enables the host device to perform read operations and write operations on the memory device;

receiving, from the host device, an access command and a first value associated with an identification of the access command, the access command triggered by the transitioning;

suspending executing the access command based at least in part on the memory device operating in the first functionality mode and the access command being associated with a write operation on the memory device;

generating, at the memory device, a second value associated with the access command using a randomization process that is based at least in part on a random quantity and a secret shared between the host device and the memory device based at least in part on receiving the access command and the first value;

validating the access command as being from an authorized user of the memory device based at least in part on the first value matching with the second value based at least in part on generating the second value;

enabling the second functionality mode of the second power mode based at least in part on validating the access command as being from an authorized user;

ceasing suspension of the access command based at least in part on enabling the second functionality mode; and executing the access command based at least in part on enabling the second functionality mode.

17. The method of claim 16, further comprising:

validating the host device as the authorized user based at least in part on the secret shared between the host device and the memory device, wherein receiving the access command is based at least in part on validating the host device.

18. The method of claim 16, wherein the randomization process at the memory device is synchronized with a second randomization process at the host device using a seed value.

19. The method of claim 16, further comprising:

receiving, from the host device, a second access command a third value associated with the second access command;

generating a fourth value associated with the second access command using the randomization process based at least in part on receiving the second access command with the third value;

determining the fourth value is different than the third value based at least in part on generating the fourth value; and refraining from executing the second access command based at least in part on determining that the fourth value is different than the third value.

20. The method of claim 19, further comprising:
initializing a counter based at least in part on determining that the fourth value is different than the third value; and
incrementing the counter to a first count value based at least in part on initializing the counter and determining that the fourth value is different than the third value.

21. The method of claim 20, further comprising:
comparing the first count value of the counter with a threshold value based at least in part on incrementing the counter to the first count value;
determining that the first count value satisfies the threshold value based at least in part on the comparison; and
disabling a functionality of the memory device based at least in part on determining the first count value satisfies the threshold value.

22. The method of claim 16, wherein the access command and the first value are received concurrently.

23. A method, comprising:
transitioning a memory device from a first power mode to a second power mode, the second power mode comprising a first functionality and a second functionality;
enabling the first functionality of the memory device based at least in part on transitioning to the second power mode, the first functionality enabling a host device to perform read-only operations on the memory device;
receiving, from the host device, an access command, the access command being associated with a write operation on the memory device;
suspending executing the access command based at least in part on the memory device operating in the first functionality;
validating the host device as an authorized user of the memory device based at least in part on enabling the first functionality after transitioning to the second power mode;
enabling the second functionality of the memory device based at least in part on validating the host device as an authorized user, the second functionality enabling the host device to perform read operations and write operations on the memory device; and
ceasing suspension of the access command based at least in part on enabling the second functionality.

24. The method of claim 23, wherein:
validating the host device is based at least in part on a secret shared between the memory device and the host device.

25. The method of claim 23, further comprising:
transitioning the memory device from the second power mode to the first power mode after an event;
transitioning the memory device from the first power mode to the second power mode after a second event;
enabling the first functionality of the memory device based at least in part on transitioning to the second power mode after the second event;
refraining from validating the host device based at least in part on enabling the first functionality and after transitioning to the second power mode after the second event; and
refraining from enabling the second functionality of the memory device based at least in part on refraining from validating the host device.

26. The method of claim 23, wherein the first power mode is associated with a power off state of the memory device and the second power mode is associated with a power on state of the memory device.

27. The method of claim 23, wherein the first power mode is associated with a low power state and the second power mode is associated with a high power state.

28. The method of claim 23, wherein:
transitioning from the first power mode to the second power mode is associated with a reset operation of the memory device.

* * * * *